United States Patent [19]

Wade

[11] 4,267,940
[45] May 19, 1981

[54] REMOVABLE CLAMP STRUCTURE FOR TANK SECTIONS WHICH AT TIMES BLOCK SAID REMOVAL

[75] Inventor: Charles E. Wade, Covina, Calif.

[73] Assignee: Purex Corporation, Lakewood, Calif.

[21] Appl. No.: 52,100

[22] Filed: Jun. 26, 1979

[51] Int. Cl.³ .................. B65D 45/32; B65D 45/34
[52] U.S. Cl. .................................. 220/321; 220/5 A; 220/80; 220/316; 220/320; 220/378
[58] Field of Search ............... 220/320, 321, 316, 378, 220/80, 5 A

[56] References Cited

U.S. PATENT DOCUMENTS

| Re. 26,127 | 12/1966 | Wade . | |
|---|---|---|---|
| 1,482,049 | 1/1924 | Swanson | 220/321 |
| 1,963,675 | 6/1934 | Plainvaux | 220/320 |
| 3,362,568 | 1/1968 | Brandt | 220/378 |

Primary Examiner—George E. Lowrance
Attorney, Agent, or Firm—William W. Haefliger

[57] ABSTRACT

A safety closure system for a tank comprises
(a) complementary sections of a tank adapted to contain pressurized fluid, said sections having annular flanges which are subject to relative separation as the tank sections relatively separate due to said fluid pressurization,
(b) said flanges respectively having oppositely facing annular surfaces which extend in relatively divergent relation away from the tank interior, and
(c) clamp means assembled onto said flanges and having channel shape with webs extending in complementary relation in said divergent surfaces to engage the flanges and block said relative separation of the flanges at which time removal of the clamp means off the flanges is also blocked by said divergent surfaces.

13 Claims, 5 Drawing Figures

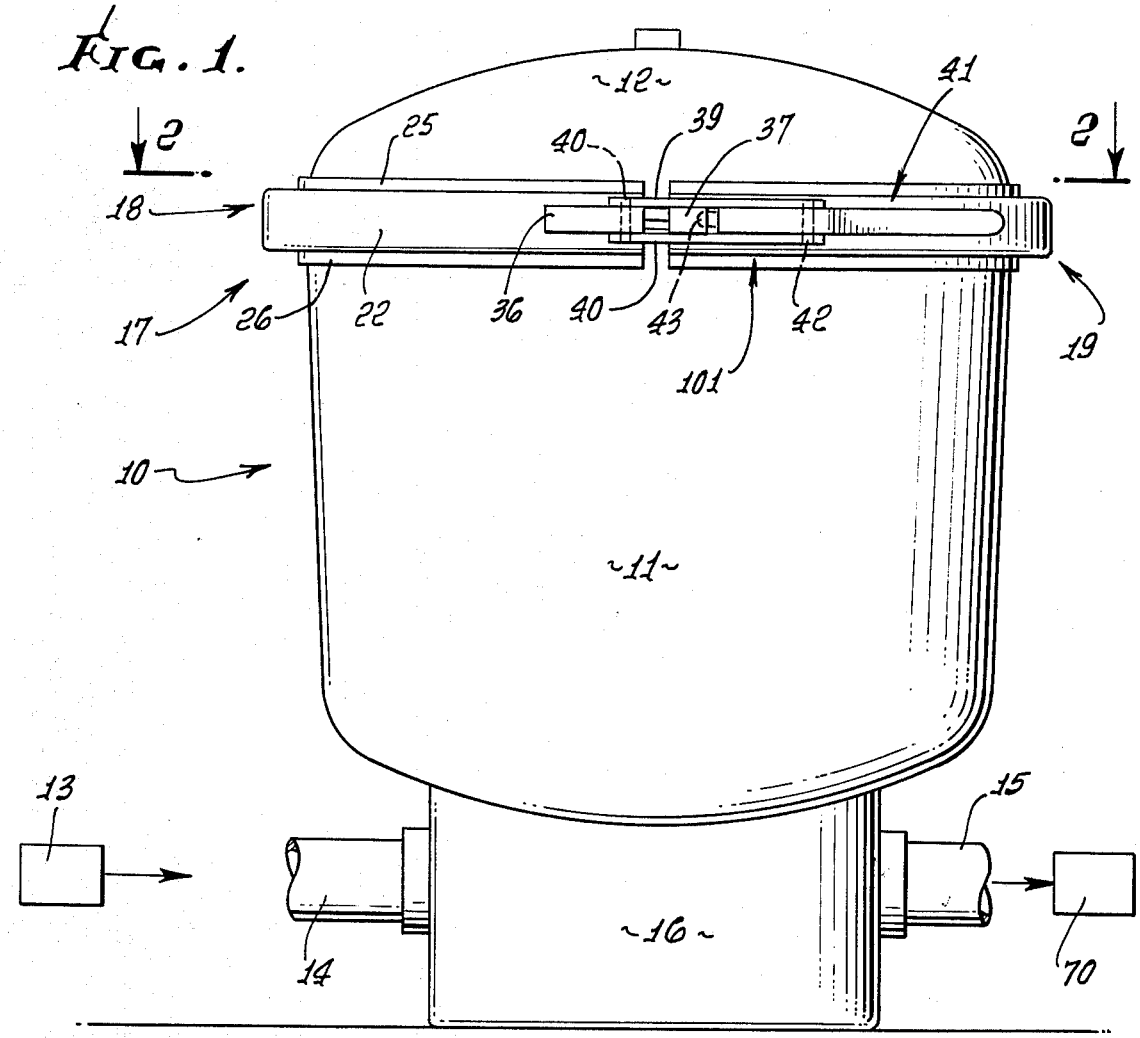
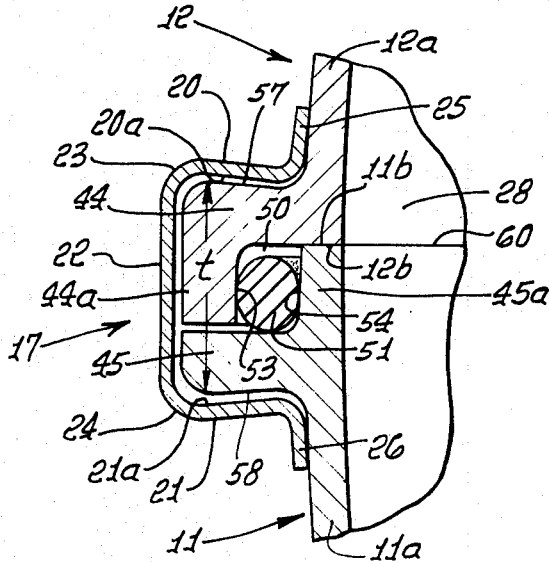
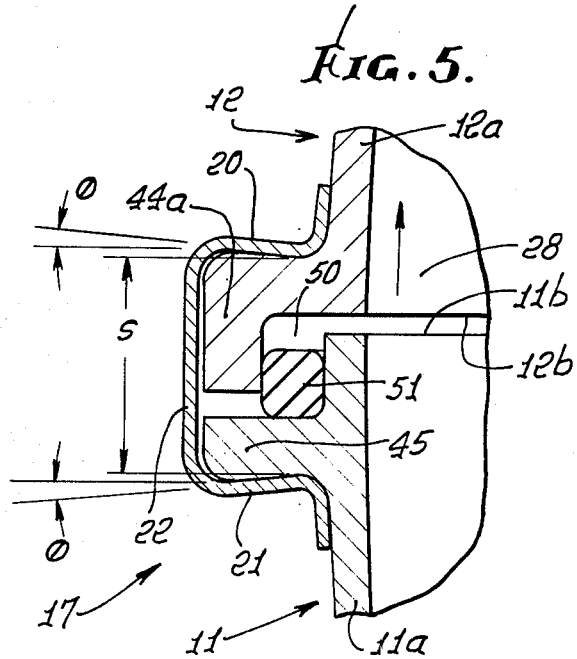

REMOVABLE CLAMP STRUCTURE FOR TANK SECTIONS WHICH AT TIMES BLOCK SAID REMOVAL

BACKGROUND OF THE INVENTION

This invention relates generally to safety closures, and more particularly concerns a connector which cannot be removed off parts or sections interconnected by the connector while such parts are displaced, as by pressure, relatively away from one another.

Sealing closures are commonly used to releasably interconnect parts or sections, such as tank sections. Thus, as shown in U.S. Pat. No. Re. 26,127, a sealing closure holds a tank top onto a tank body. Typically, the tank may be internally pressurized, in use, the closure seal acting to seal in the pressure. While such closures have many advantages, there is a need to prevent the user from prying the closure off the interconnected tank body and top during the time that the tank is pressurized. If such a user, despite all precautions against such removal, succeeds in prying loose the closure, he risks possible injury should the tank top suddenly lift under pressure. This need also extends to structures other than tanks, and wherein sections are interconnected by removable closures.

SUMMARY OF THE INVENTION

It is a major object of the invention to provide a solution to the above problem and which will meet the above need. Basically, the invention is directed to a closure means that cannot be removed when the interconnected sections are subjected to force tending to separate them.

As will be seen, the invention is adapted for use in a closure system which comprises complementary sections adapted to be urged in a separation direction, the sections having flanges with oppositely facing generally annularly extending surfaces extending generally relatively divergently in radially outward directions. In this environment, a clamp means is provided to be assembled onto such flanges, the clamp means having channel shape with webs extending in complementary relation to the divergent surfaces to engage the flanges and block such relative separation of the flanges, at which time removal of the clamp means off the flanges is also blocked by the divergent surfaces.

In this regard, the complementary sections may comprise tank lid and body sections, the tank being subject to internal pressurization, and the clamp means may include channel shaped sections which are hinged together, and which have an over-center latch to clamp the sections radially inwardly onto the flanges.

As will be seen, the webs typically have relatively divergent surfaces complementary to flange divergent surfaces to engage same when the flanges are urged relatively apart, and to lock to the flanges so as to positively block separation of the webs and closure sections off the flanges.

These and other objects and advantages of the invention, as well as the details of an illustrative embodiment, will be more fully understood from the following description and drawings, in which:

DRAWING DESCRIPTION

FIG. 1 is a side elevation showing a pressurizable tank incorporating the invention;

FIG. 4 is an enlarged section taken on lines 4—4 of FIG. 2, and showing details of a sealing closure; and FIG. 5 is a view like FIG. 4, but showing the sealing closure of FIG. 4 in pressurized condition.

DETAILED DESCRIPTION

Figure 2:
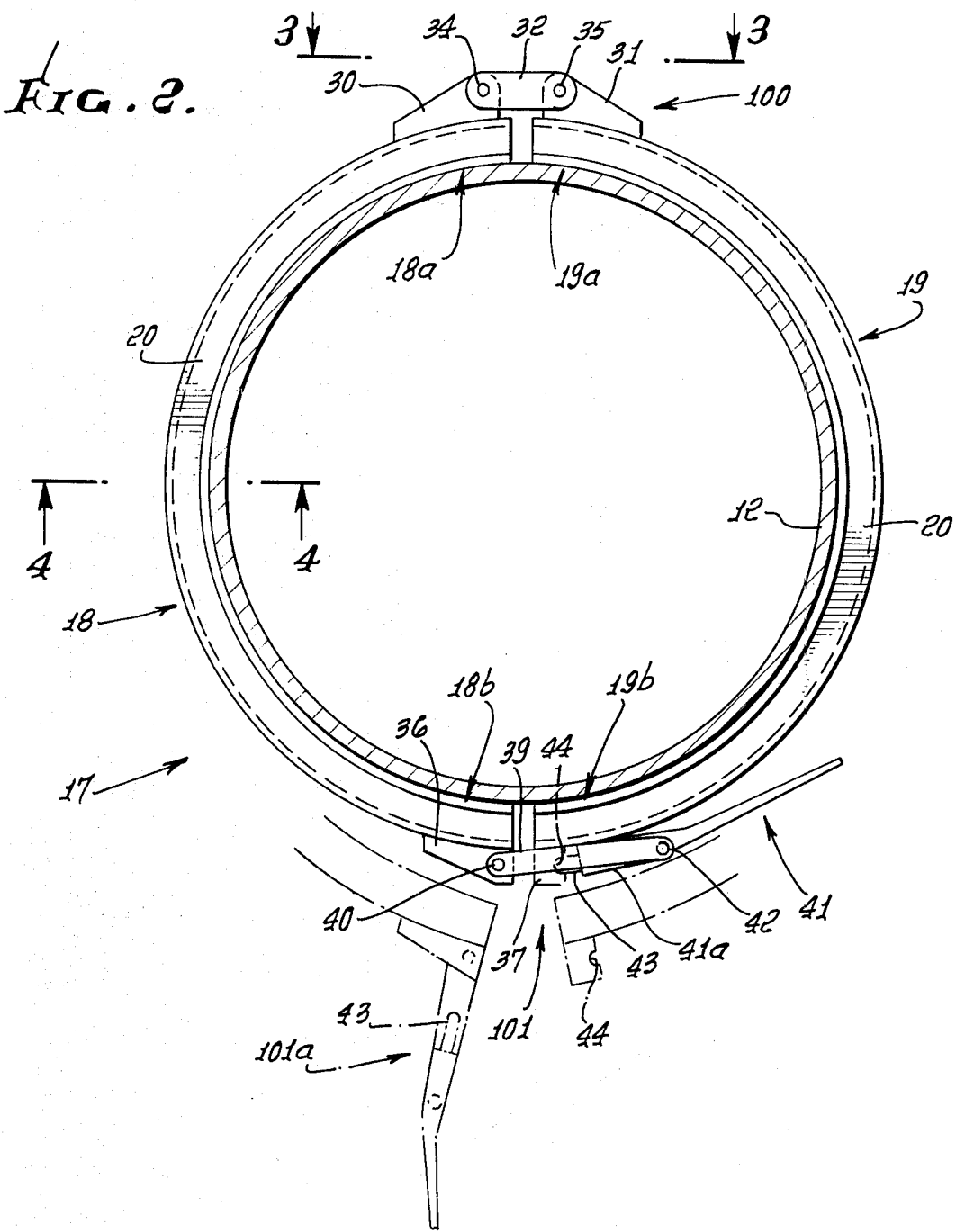
FIG. 2 is a plan view on lines 2—2 of FIG. 1.
Figure 3:
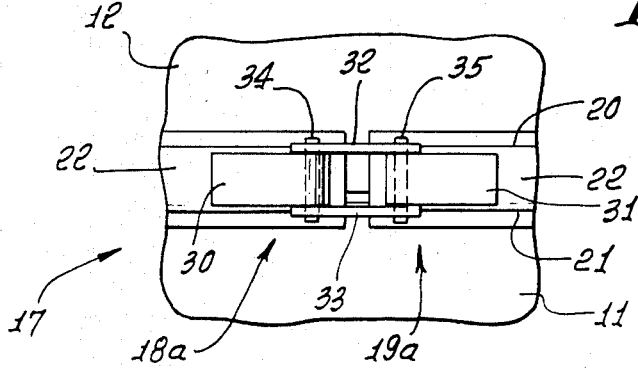
FIG. 3 is a side elevation taken on lines 3—3 of FIG. 2.

Referring to FIGS. 1-3, a fluid pressure tank 10 has two complementary sections such as a body section 11 and a removable cover section 12. The tank is adapted to receive fluid under pressure, as for example from a fluid pressure source 13 and inlet pipe 14. Fluid may leave the tank via outlet pipe 15 connected to structure 16 at the tank base. One example of such a tank is that described in U.S. Pat. No. 3,451,554 entitled "Swimming Pool Filter with Alternate Flow Valve Control." Liquid filtering material may be located in the tank, and the cover section is removable to gain access to that material, as for example to replace same. The pool is indicated at 70.

A removable clamp means, as for example at 17, is provided to (a) hold the cover section on the body section; (b) to provide a quick release so as to enable removal of the cover sections when the fluid in the tank is not pressurized to any substantial extent, and finally to (c) prevent removal of the clamp means when the tank interior fluid is substantially pressurized, so as to prevent sudden blow-off of the cover which could result from inadvertent removal of the clamp means.

As seen in FIGS. 2-5, the clamp means may include two arcuate or semi-circular sections 18 and 19, each section being channel shaped and including two webs, as for example upper and lower webs 20 and 21, interconnected by a third web 22 as at rounded corners 23 and 24. Terminal flanges 25 and 26 are respectively integral with the webs 20 and 21 to strengthen and stiffen them against bending deflection about the pivot areas represented by rounded corners 23 and 24. Flanges 25 and 26 extend generally vertically in opposite directions; web 22 extends generally vertically, and the upper and lower webs 20 and 21 extend generally horizontally, but also mutually divergently away from the tank interior indicated at 28 in FIGS. 4 and 5.

The clamping sections 18 and 19 may be hinged together by an assembly 100 shown in FIG. 3 that includes lugs 30 and 31 integral with the terminal portions 18a and 19c of the sections, and links 32 and 33 pivotally connected by pins 34 and 35 to the lugs.

A releasable latch means 101 for the sections 18 and 19 is shown in FIGS. 1 and 3, generally diametrically opposite from the hinge assembly 100. That latch means may include lugs 36 and 37 respectively secured to webs 22 at terminal portions 18b and 19b of the sections 18 and 19. Toggle links 39 are pivotally connected to opposite sides of lug 36 by a pin 40. The opposite ends of the links are pivotally connected to a base portion 41a of a toggle lever or handle 41, by a pin 42. A nose 43 on the lever is removably receivable in a recess 44 defined by the lug 37 and the lever 41 is adapted to pivot over center about and relative to the pivot afforded by the nose 43 engagement with lug 37, whereby the sections 18 and 19 may be drawn into the positions shown in FIGS. 1-5. The outwardly pivoted release position of the latch means is indicated by broken line positions 101a, in FIG. 2.

Referring again to FIGS. 4 and 5, the tank sections 11 and 12 have cylindrical walls indicated at 11a and 12a. Integral with, or attached to, those walls are upper and lower annular flanges 44 and 45 which are closed relatively toward one another in FIG. 4, and which are shown as vertically displaced due to tank pressurization, in FIG. 5. The sections 11 and 12 also have stop shoulders which interengage at times when the tank interior pressure is sufficiently reduced, to support the upper section 12 on the lower section 11. See for example shoulders 11b and 12b, in FIG. 4. Sufficient pressurization of the tank interior results in relative vertical separation of the shoulders, as seen in FIG. 5.

It will also be noted in FIGS. 4 and 5 that the sections 11 and 12 have surfaces adjacent the flanges to form an annular seal space, as at 50. An annular, typically non-metallic, and elastomeric seal ring 51 is shown in that space. Further, one of the flanges on one section, as for example flange 44, has a first vertical extension 44a at the outer side of the seal ring, and the other section (as for example section 11) has a second vertical extension 45a adjacent flange 45 and at the inner side of the seal. The seal remains sealingly confined between those two vertical extensions in both FIGS. 4 and 5, i.e., between vertical surfaces 53 and 54 defined by those extensions. Accordingly, fluid pressure remains confined in the tank interior.

Should it be desired to gain access to the tank interior, as for example to replace filter material therein, it is not possible to remove the clamp means in FIG. 5, i.e., while the tank is pressurized, due to the fact that, as shown in FIG. 5, the clamp webs 20 and 21 interact with the flanges to block radial displacement of the clamp sections 18 and 19 off the flanges 44 and 45. The tank interior must first be de-pressurized to allow the cover section 12 to seat down on the body section 11, as shown in FIG. 4, before the clamp sections can be removed. For this purpose, flanges 44 and 45 have oppositely facing annular surfaces 57 and 58 which extend in relatively divergent relation away from the tank interior; also, the webs 20 and 21 have relatively divergent surfaces 20a and 21a complementary to the flange divergent surfaces 57 and 58, respectively, to interengage same in response to relative separation of the flanges as shown in FIG. 5.

More specifically, the upper web divergent surface 20a (and also flange surface 57) extends radially outwardly and upwardly relative to a horizontal plane (indicated for example at 60), and the lower web divergent surface 21a (and also flange surface 58) extends radially outwardly and downwardly relative to that horizontal plane. Further, each of the web surfaces preferably extends at an angle $\phi$ between 3° and 8° relative to the horizontal, as shown in FIG. 5, and preferably that angle $\phi$ is about 6°.

It will further be noted that the web divergent surfaces 20a and 21a preferably have minimum separation "s" which is about the same as the maximum spacing "t" of the flange divergent surfaces 57 and 58 when the stop shoulders 11b and 12b are interengaged. These dimensions are shown in FIGS. 4 and 5. Accordingly, when the stop shoulders are interengaged as in FIG. 4, the clamp means can be readily disengaged from the flanges.

Finally, it should be pointed out that the safety closure 17 has loose dovetail interfit with the two flanges 44 and 45 in FIG. 4, and tight dovetail interfit with the flanges in FIG. 5.

I claim:
1. In a tank closure system, the combination comprising
   (a) complementary sections of a tank adapted to contain pressurized fluid, said sections having annular flanges which are subject to relative separation as the tank sections relatively separate due to said fluid pressurization,
   (b) said flanges respectively having oppositely facing annular surfaces which extend in relatively divergent relation away from the tank interior, and
   (c) clamp means assembled onto said flanges and having channel shape with webs extending in complementary relation to said divergent surfaces to engage the flanges and block said relative separation of the flanges at which time removal of the clamp means off the flanges is also blocked by said divergent surfaces,
   (d) the webs having relatively divergent surfaces complementary to said flange divergent surfaces to engage same in response to said relative separation of the flanges, the webs being vertically spaced apart, the upper web divergent surface extending radially outwardly and upwardly relative to a horizontal plane, and the lower web divergent surface extending radially outwardly and downwardly relative to said horizontal plane,
   (e) there being terminal flanges respectively integral with the webs to stiffen the webs, said terminal flanges extending generally vertically proximate said tank sections.

2. The combination of claim 1 wherein at least one of said web divergent surfaces extends at an angle of between 3° and 8° relative to said horizontal plane, in axial radial planes intersecting said surface.

3. The combination of claim 1 wherein each of said web divergent surfaces extends at an angle of between 3° and 8° relative to said horizontal plane, in axial radial planes intersecting each said surface.

4. The combination of claim 2 wherein said angle is about 6°.

5. The combination of claim 3 wherein each of said angles is about 6°.

6. The combination of claim 1 wherein said sections have stop shoulders which interengage at times when tank interior pressure is sufficiently reduced, the clamp means then being radially removable off said flanges due to the existence of clearance between the flanges and webs.

7. The combination of claim 1 wherein said web divergent surfaces have minimum separation which is about the same as the maximum spacing of said flange divergent surfaces when said shoulders are interengaged.

8. The combination of claim 1 wherein said web divergent surfaces have loose dovetail interfit with said flange divergent surfaces.

9. The combination of claim 6 wherein the section have surfaces adjacent said flanges to form an annular seal space, and including an annular seal in said space to seal off between certain of said surfaces, said stop shoulders extending adjacent said seal space.

10. The combination of claim 9 wherein the flanges include an upper flange and a lower flange, one of the flanges on one section having a first vertical extension at the outerside of the seal, and the other section having a second vertical extension at the inner side of the seal, the seal being sealingly confined between said vertical extensions, the seal being non-metallic.

11. For use in a closure system which comprises
(a) complementary sections adapted to be urged in a separating direction, the sections having flanges with oppositely facing, generally annularly extending surfaces which extend relatively divergently in radially outward directions,
(b) the improvements which comprises a clamp means assembled onto said flanges and having channel shape with webs extending in complementary relation to said divergent surfaces to engage the flanges and block said relative separation of the flanges at which times removal of the clamp means off the flanges is also blocked by said divergent surfaces,
(c) the webs being vertically spaced apart, the upper web divergent surface extending radially outwardly and upwardly relative to a horizontal plane, and the lower web divergent surface extending radially outwardly and downwardly relative to said horizontal plane,
(e) there being terminal flanges respectively integral with the webs to stiffen the webs, said terminal flanges extending generally vertically proximate said tank sections.

12. The improvement of claim 11 wherein the clamp means includes arcuate sections defining said webs, hinge means interconnecting the sections, and over-center latch structure connected to the sections to urge them relatively toward one another and onto the flanges.

13. The combination of claim 1 wherein the clamp means includes arcuate sections defining said webs, hinge means interconnecting the sections, and over-center latch structure connected to the sections to urge them relatively toward one another and onto the flanges.

* * * * *